United States Patent
Lin

(10) Patent No.: US 10,603,734 B2
(45) Date of Patent: Mar. 31, 2020

(54) METHOD FOR HARDFACING A METAL ARTICLE

(71) Applicant: GENERAL ELECTRIC COMPANY, Schenectady, NY (US)

(72) Inventor: Dechao Lin, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 336 days.

(21) Appl. No.: 15/653,069

(22) Filed: Jul. 18, 2017

(65) Prior Publication Data
US 2019/0022786 A1    Jan. 24, 2019

(51) Int. Cl.
*B23K 9/04* (2006.01)
*B23K 15/00* (2006.01)
*B23K 26/34* (2014.01)
*B23K 101/00* (2006.01)
*B23K 103/08* (2006.01)

(52) U.S. Cl.
CPC .......... *B23K 9/042* (2013.01); *B23K 15/0086* (2013.01); *B23K 26/34* (2013.01); *B23K 2101/001* (2018.08); *B23K 2103/08* (2018.08)

(58) Field of Classification Search
CPC .............. B23K 26/345; B23K 26/0807; B23K 31/125; B23K 26/0012; B23K 26/0626
USPC ................... 219/76.1, 121.63, 121.66, 137 R
See application file for complete search history.

(56) References Cited

U.S. PATENT DOCUMENTS

| | | | |
|---|---|---|---|
| 7,533,795 B2 | 5/2009 | Schaeffer et al. | |
| 8,703,044 B2 | 4/2014 | Sathian et al. | |
| 2007/0154338 A1* | 7/2007 | Sathian | B23K 1/0018 419/5 |
| 2007/0163128 A1* | 7/2007 | Tarrerias | B23D 65/00 30/350 |
| 2012/0231295 A1 | 9/2012 | Kottilingam et al. | |
| 2012/0294729 A1 | 11/2012 | Szabo et al. | |
| 2015/0048058 A1* | 2/2015 | Bruck | B23K 26/34 219/76.14 |
| 2015/0202717 A1* | 7/2015 | Bruck | B23K 25/005 219/73.21 |
| 2016/0045990 A1* | 2/2016 | Bruck | B23P 6/007 219/76.1 |
| 2017/0021459 A1* | 1/2017 | Ahorner | B23D 65/00 |

FOREIGN PATENT DOCUMENTS

WO    WO-2015075267 A1 *    5/2015    ............. B23D 65/00

\* cited by examiner

*Primary Examiner* — Thien S Tran
(74) *Attorney, Agent, or Firm* — McNees Wallace & Nurick LLC

(57) ABSTRACT

A method for hardfacing a metal article is disclosed including applying a first pass of a metal composition to a surface of the metal article along a first application path, applying a second pass of the metal composition to the surface along a second application path, and applying a third pass of the metal composition to the surface along a third application path between the first application path and the second application path. The first pass and the second pass form a hardfacing perimeter, and the third pass fills in the hardfacing perimeter.

22 Claims, 2 Drawing Sheets

METHOD FOR HARDFACING A METAL ARTICLE

FIELD OF THE INVENTION

The present invention is directed to methods for hardfacing metal articles. More particularly, the present invention is directed to methods for hardfacing metal articles by applying a plurality of passes of a metal composition.

BACKGROUND OF THE INVENTION

Certain articles of manufacture, such as gas turbine buckets may benefit from a hardfacing layer being applied to the surface of the article. Hardfacing may be applied by manual arc welding, however manual arc welding, while inexpensive and facile, requires a preheating step, is susceptible to cracking, and subject to variable weld quality due to welder variability and preheat variability. Laser cladding requires reduced heat input relative to manual arc welding, but is expensive and also susceptible to cracking. Brazing with a pre-sintered preform ("PSP") provides adequate joint quality but requires a tight joint gap and is expensive. High Velocity Oxygen Fuel ("HVOF") thermal spray is facile to apply, but requires additional processing. Further, none of these techniques are capable of closing holes in the article in a single process and simultaneously with hardfacing the article.

BRIEF DESCRIPTION OF THE INVENTION

In an exemplary embodiment, a method for hardfacing a metal article includes applying a first pass of a metal composition to a surface of the metal article along a first application path, applying a second pass of the metal composition to the surface along a second application path, and applying a third pass of the metal composition to the surface along a third application path between the first application path and the second application path. The first pass and the second pass form a hardfacing perimeter, and the third pass fills in the hardfacing perimeter.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary methods for closing pluralities of holes in metal articles. Embodiments of the present disclosure, in comparison to articles and methods not utilizing one or more features disclosed herein, decrease costs, increase process control, increase process efficiency, increase process speed, or combinations thereof.

Figure 1:
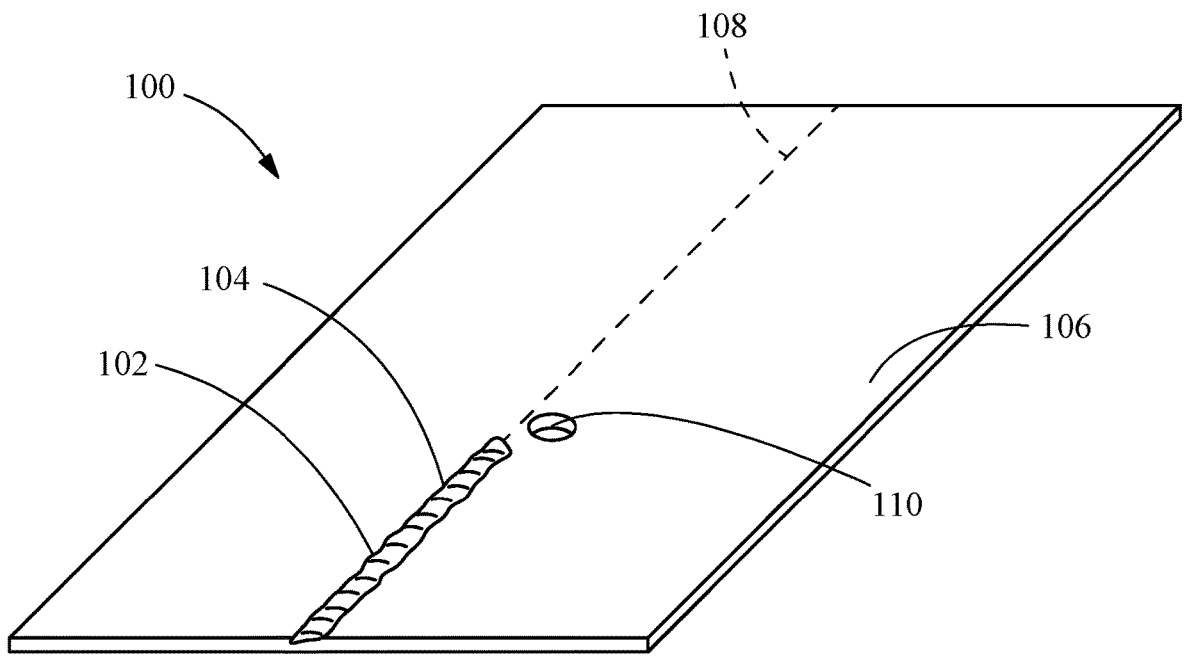
FIG. 1 is a perspective view of a metal article during application of a metal composition along a first application path, according to an embodiment of the present disclosure.
Figure 2:
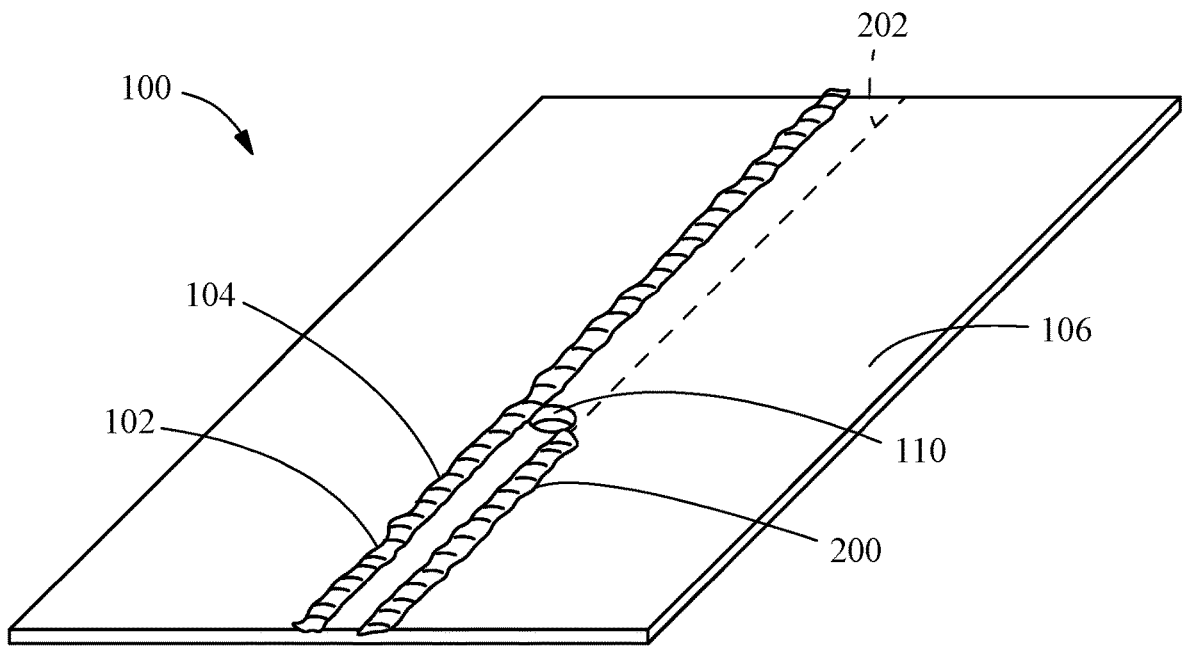
FIG. 2 is a perspective view of the metal article of FIG. 1 during application of the metal composition along a second application path, according to an embodiment of the present disclosure.
Figure 3:
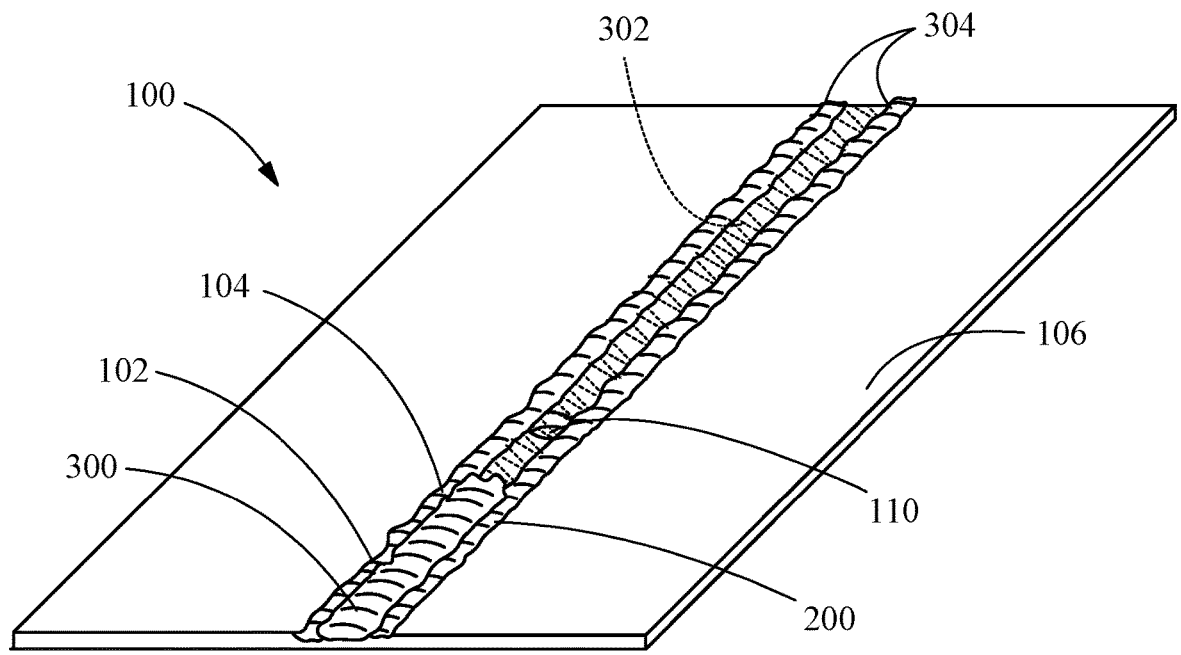
FIG. 3 is a perspective view of the metal article of FIG. 2 during application of the metal composition along a third application path, according to an embodiment of the present disclosure.
Figure 4:
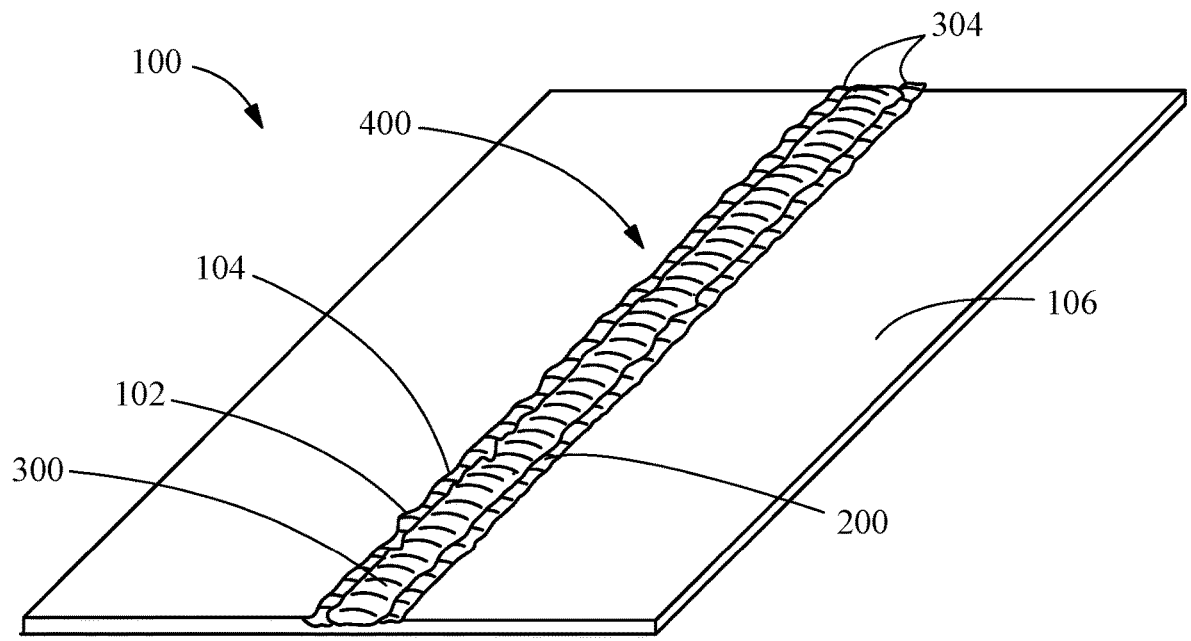
FIG. 4 is a perspective view of the metal article of FIG. 3 following application of the metal composition along the third application path, according to an embodiment of the present disclosure.

Referring to FIGS. 1-4, a method for hardfacing a metal article 100 includes applying a first pass 102 of a metal composition 104 to a surface 106 of the metal article 100 along a first application path 108, applying a second pass 200 of the metal composition 104 to the surface 106 along a second application path 202, and applying a third pass 300 of the metal composition 104 to the surface 106 along a third application path 302 between the first application path 108 and the second application path 202. The first pass 102 and the second pass 200 form a hardfacing perimeter 304, and the third pass 300 fills in the hardfacing perimeter 304. Hardfacing the metal article 100 forms a hardface layer 400 disposed on the metal article 100.

The metal article 100 may be any suitable article, including, but not limited to, a turbine component. Suitable turbine components include, but are not limited to, hot gas path components, buckets (also known as blades), nozzles (also known as vanes), shrouds, combustors, combustion liners, transition pieces, and combinations thereof.

The metal article 100 may include any suitable material composition, including, but not limited to, superalloys, nickel-based superalloys, GTD 111, GTD 141, GTD 444, GTD 741, INCONEL 738, INCONEL 939, René 108, or combinations thereof.

The metal composition 104 may include any suitable material composition, including, but not limited to, CM 64. In one embodiment, the metal composition 104 of the first pass 102 is the metal composition 104 of the second pass 200. In another embodiment, the metal composition 104 of the first pass 102 is distinct from the metal composition 104 of the second pass 200. In one embodiment, the metal composition 104 of the first pass 102 is the metal composition 104 of the third pass 300. In another embodiment, the metal composition 104 of the first pass 102 is distinct from the metal composition 104 of the third pass 300. In one embodiment, the metal composition 104 of the second pass 200 is the metal composition 104 of the third pass 300. In another embodiment, the metal composition 104 of the second pass 200 is distinct from the metal composition 104 of the third pass 300. In one embodiment, the metal composition 104 of the first pass 102 is the metal composition 104 of the second pass 200 and the metal composition 104 of the third pass 300. In another embodiment, the metal composition 104 of the first pass 102 is the metal composition 104 of the second pass 200, but is distinct from the metal composition 104 of the third pass 300.

As used herein, "CM 64" refers to an alloy including a composition, by weight, of about 28% chromium, about 5% nickel, about 19.5% tungsten and molybdenum, about 1% vanadium, about 0.05% boron, about 0.9% carbon, and a balance of cobalt. CM 64 is available from Rolled Alloys, 125 W. Sterns Road, Temperance, Mich. 48182.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel. GTD 111 is available from General Electric Company, 1 River Road, Schenectady, N.Y. 12345.

As used herein, "GTD 141" refers to an alloy including a composition, by weight, of about 13.8% chromium, about 9.4% cobalt, about 3.8% tungsten, about 4.8% titanium, about 2.8% aluminum, about 1.4% niobium, about 1.5% molybdenum, and a balance of nickel. GTD 141 is available from General Electric Company, 1 River Road, Schenectady, N.Y. 12345.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel. GTD 444 is available from General Electric Company, 1 River Road, Schenectady, N.Y. 12345.

As used herein, "GTD 741" refers to an alloy including a composition, by weight, of about 8.3% cobalt, about 0.2% iron, about 16% chromium, about 3.3% aluminum, about 3.4% titanium, about 2.6% tungsten, about 1.7% molybdenum, about 1.7% niobium, about 0.1% carbon, about 0.1% manganese, about 0.1% vanadium, and a balance of nickel. GTD 741 is available from General Electric Company, 1 River Road, Schenectady, N.Y. 12345.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel. INCONEL 738 is available from Special Metals Corporation, 3200 Riverside Drive, Huntington, W. Va. 25720.

As used herein, "INCONEL 939" refers to an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel. INCONEL 939 is available from Special Metals Corporation, 3200 Riverside Drive, Huntington, W. Va. 25720.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel. René 108 is commercially available under that designation.

Applying the metal composition 104 may include any suitable application technique, including, but not limited to, an additive welding technique. Suitable additive welding techniques include, but are not limited to, consumable electrode welding, scanning consumable electrode welding, gas metal arc welding, scanning gas metal arc welding, flux core arc welding, scanning flux core arc welding, metal core arc welding, scanning metal core arc welding, laser cladding with filler metal, laser melting with filler metal, electron beam melting with filler metal, direct metal laser melting, or combinations thereof.

The additive welding technique may operate at any suitable welding speed, including, but not limited to, a welding speed of between about 10 ipm to about 90 ipm, alternatively between about 20 ipm to about 80 ipm, alternatively between about 30 ipm to about 70 ipm, alternatively between about 10 ipm to about 30 ipm, alternatively between about 20 ipm to about 40 ipm, alternatively between about 30 ipm to about 50 ipm, alternatively between about 40 ipm to about 60 ipm, alternatively between about 50 ipm to about 70 ipm, alternatively between about 60 ipm to about 80 ipm, alternatively between about 70 ipm to about 90 ipm.

Hardfacing the metal article 100 may be free of applying PSP to the surface 106, free of laser cladding the surface 106, free of thermally spraying the surface 106, free of HVOF thermally spraying the surface 106, free of manually arc welding the surface 106, or combinations thereof.

Hardfacing the metal article 100 may be essentially free of forming cracks. As used herein, "essentially" free of forming cracks indicates that any cracks forming during the closing of the plurality of holes 110 are less than about 0.03 inches in largest dimension, alternatively less than about 0.02 inches in largest dimension, alternatively less than about 0.01 inches in largest dimension. Further, "essentially" free of forming cracks excludes any temporary cracks which may form during the hardfacing but which are also removed during the hardfacing.

Hardfacing the metal article 100 may be free of a pre-hardfacing heat treatment, may be free of a post-hardfacing heat treatment, or both. In one embodiment, the metal article 100 is at room temperature immediately prior to applying the first pass 102. In another embodiment, the metal article 100 is allowed to cool to room temperature commencing immediately following applying the third pass 300, excluding any incidental heat input generated by any finishing technique applied to remove excess metal composition 104. In a further embodiment, the metal article 100 is at room temperature immediately prior to applying the first pass 102 and is allowed to cool to room temperature commencing immediately following applying the third pass 300.

In one embodiment, the first pass 102, or a portion thereof, is removed after applying the third pass 300. In another embodiment, the second pass 200, or a portion thereof, is removed after applying the third pass 300. In a further embodiment, both the first pass 102, or a portion thereof and the second pass 200, or a portion thereof, are removed after applying the third pass 300. Removing the first pass 102, a portion thereof, the second path 200, a portion thereof, or both may include removing cracks which may form while applying the first pass 102, the second path 200, or both.

Hardfacing the metal article 100 may include any suitable maximum fusion depth, including, but not limited to, about 0.001 inches, alternatively about 0.002 inches, alternatively about 0.005 inches, alternatively about 0.01 inches, alternatively about 0.02 inches.

Hardfacing the metal article 100 may include any suitable hardfacing rate, including, but not limited to, at least about 1 $m^2$/min, alternatively at least about 1.5 $m^2$/min, alternatively at least about 2 $m^2$/min, alternatively at least about 2.5 $m^2$/min, alternatively at least about 5 $m^2$/min, alternatively at least about 10 $m^2$/min.

Applying the first pass 102 may include a single discrete application pass or a plurality of application passes. Applying the second pass 200 may include a single discrete application pass or a plurality of application passes. Applying the third pass 300 may include a single discrete application pass or a plurality of application passes.

In one embodiment, applying the second pass 200 follows applying the first pass 102. In another embodiment, applying the first pass 102 and applying the second pass 200 occurs simultaneously.

In one embodiment, the first pass 102 is isolated from an adjacent section of hardfacing. In another embodiment, the first pass 102 is directly adjacent to and contacting an adjacent first pass, an adjacent second pass, or an adjacent third pass of an adjacent section of hardfacing. In yet another embodiment, the first pass 102 is an adjacent first pass, an adjacent second pass, or an adjacent third pass of an adjacent section of hardfacing.

In one embodiment, the second pass 200 is isolated from an adjacent section of hardfacing. In another embodiment, the second pass 200 is directly adjacent to and contacting an adjacent first pass, an adjacent second pass, or an adjacent third pass of an adjacent section of hardfacing. In yet another embodiment, the second pass 200 is an adjacent first pass, an adjacent second pass, or an adjacent third pass of an adjacent section of hardfacing.

In one embodiment (shown), the third application path 302 oscillates between the first pass 102 and the second pass 200. As used herein, "oscillates" indicates repeatedly changing direction, and is inclusive of waveforms, sinusoidal waveforms, square waveforms, triangular waveforms, sawtooth waveforms, irregular waveforms, and combinations thereof. In another embodiment (not shown), the third application path 302 proceeds along a straight, curved, or combination thereof, non-oscillating pathway aligned with the first pass 102 and the second pass 200. In yet another embodiment, the third application path 302 oscillates between the first pass 102 and the second pass 200 in at least one portion and proceeds along a straight, curved, or combination thereof, non-oscillating pathway aligned with the first pass 102 and the second pass 200 in another portion.

In one embodiment, the metal article 100 includes at least one hole 110, and applying the metal composition 104 to the surface 106 of the metal article 100 along the first application path 108, applying the metal composition 104 to the surface 106 of the metal article 100 along the second application path 202, and applying the metal composition 104 to the surface 106 of the metal article 100 along the third application path 302, closes the at least one hole 110. The at least one hole 110 may include any suitable hole conformation or combinations of hole confirmations, including, but not limited to, at least one hole 110 which is circular (shown), elliptical, racetrack, triangular, square, or rectangular.

In one embodiment, closing the at least one hole 110 includes closing at least about 10 holes 110 within about 6 minutes, alternatively at least about 25 holes 110, alternatively at least about 50 holes 110, alternatively at least about 75 holes 110, alternatively at least about 100 holes 110, alternatively at least about 250 holes 110, alternatively at least about 500 holes 110, alternatively at least about 750 holes 110, alternatively at least about 1,000 holes 110, alternatively at least about 1,500 holes 110, alternatively at least about 2,000 holes 110, alternatively at least about 5,000 holes 110.

Closing the at least one hole 110 may be essentially free of weld cratering. As used herein, "essentially" free of weld cratering indicates that any cratering over a closed hole 110 is less than about 0.03 inches, alternatively less than about 0.02 inches, alternatively less than about 0.01 inches, alternatively less than about 0.005 inches, alternatively less than about 0.001 inches.

In one embodiment, following applying the third pass 300 of the metal composition 104 to the surface 106 along the third application path 302 between the first application path 108 and the second application path 202, the hardface layer 400 is finished. Finishing the hardface layer 400 may include any suitable finishing technique, including, but not limited to, machining, polishing, abrasive blasting, burnishing, peening, electropolishing, grinding, etching, buffing, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for hardfacing a metal article, comprising:
    applying a first pass of a metal composition to a surface of the metal article along a first application path;
    applying a second pass of the metal composition to the surface along a second application path; and
    applying a third pass of the metal composition to the surface along a third application path between the first application path and the second application path;
    wherein the first pass and the second pass form a hardfacing perimeter, and the third pass fills in the hardfacing perimeter, and
    wherein applying the third pass includes the third application path oscillating between the first pass and the second pass.

2. The method of claim 1, further including removing at least one of the first pass and the second pass following applying the third pass.

3. The method of claim 1, wherein applying the metal composition includes an additive welding technique.

4. The method of claim 3, wherein the additive welding technique is selected from the group consisting of consumable electrode welding, scanning consumable electrode welding, gas metal arc welding, scanning gas metal arc welding, flux core arc welding, scanning flux core arc welding, metal core arc welding, scanning metal core arc welding, laser cladding with filler metal, laser melting with filler metal, electron beam melting with filler metal, direct metal laser melting, and combinations thereof.

5. The method of claim 3, wherein the additive welding technique operates at between about 10 ipm to about 90 ipm.

6. The method of claim 1, wherein hardfacing the metal article includes a maximum fusion depth of about 0.02 inches.

7. The method of claim 1, further including hardfacing at least about 1 m$^2$/min.

8. The method of claim 1, wherein applying the first pass includes a plurality of application passes.

9. The method of claim 1, wherein applying the second pass includes a plurality of application passes.

10. The method of claim 1, wherein applying the third pass includes a plurality of application passes.

11. The method of claim 1, wherein applying the first pass and applying the second pass occurs simultaneously.

12. The method of claim 1, wherein hardfacing the metal article is free of applying a pre-sintered preform to the surface and free of laser cladding the surface.

13. The method of claim 1, wherein hardfacing the metal article is free of thermally spraying the surface.

14. The method of claim 1, wherein hardfacing the metal article is free of manually arc welding the surface.

15. The method of claim 1, wherein hardfacing the metal article is essentially free of forming cracks.

16. The method of claim 1, wherein hardfacing the metal article is free of a pre-hardfacing heat treatment and a post-hardfacing heat treatment.

17. The method of claim 1, wherein the metal article is a turbine component.

18. The method of claim 1, wherein the metal article includes a material composition selected from the group consisting of superalloys, nickel-based superalloys, GTD 111, GTD 141, GTD 444, GTD 741, INCONEL 738, INCONEL 939, René 108, and combinations thereof.

19. The method of claim 1, wherein the metal composition includes CM 64.

20. The method of claim 1, wherein the metal article includes at least one hole, and applying the first pass, the second pass, and the third pass closes the at least one hole.

21. The method of claim 1, wherein the third pass fills in all of the hardfacing perimeter.

22. A method for hardfacing a metal article, comprising:
applying a first pass of a metal composition to a surface of the metal article along a first application path;
applying a second pass of the metal composition to the surface along a second application path; and
applying a third pass of the metal composition to the surface along a third application path between the first application path and the second application path;
wherein the first pass and the second pass form a hardfacing perimeter, and the third pass fills in all of the hardfacing perimeter, and
wherein the metal article is a turbine component.

* * * * *